United States Patent [19]

Scholl et al.

[11] 4,276,404

[45] Jun. 30, 1981

[54] PROCESS FOR THE PRODUCTION OF INORGANIC-ORGANIC SYNTHETIC MATERIALS

[75] Inventors: Hans-Joachim Scholl, Cologne; Dieter Dieterich, Leverkusen, both of Fed. Rep. of Germany; Peter Markusch, New Martinsville, W. Va.

[73] Assignee: Bayer Aktiengesellschaft, Leverkusen, Fed. Rep. of Germany

[21] Appl. No.: 930,128

[22] Filed: Aug. 1, 1978

[30] Foreign Application Priority Data

Aug. 2, 1977 [DE] Fed. Rep. of Germany ....... 2734691

[51] Int. Cl.$^3$ ..................... C08G 18/22; C08G 18/14; C08G 18/77
[52] U.S. Cl. ......................................... 528/57; 521/65; 521/122; 521/131; 521/160; 521/162; 528/67; 528/71; 260/29.2 TN
[58] Field of Search ............................ 528/57, 67, 71; 521/131, 122, 65, 162, 160

[56] References Cited

U.S. PATENT DOCUMENTS

| | | | |
|---|---|---|---|
| 3,826,769 | 7/1974 | Carlson | 528/71 |
| 3,983,081 | 9/1976 | Dieterich et al. | 528/71 |
| 4,057,519 | 11/1977 | Summers et al. | 521/131 |
| 4,097,423 | 6/1978 | Dieterich | 521/162 |
| 4,105,594 | 8/1978 | Dieterich et al. | 521/162 |
| 4,129,696 | 12/1978 | Markusch et al. | 521/162 |
| 4,198,487 | 4/1980 | Scholl et al. | 521/65 |

*Primary Examiner*—H. S. Cockeram
*Attorney, Agent, or Firm*—Gene Harsh; Joseph C. Gil; Lyndanne M. Whalen

[57] ABSTRACT

The instant invention is directed to a process for the production of inorganic-organic synthetic materials having high strength, elasticity, dimensional stability under heat, and flame resistance, consisting of a polymer-polysilicic acid gel composite material in the form of a solid/solid xerosol, said process comprising mixing
  (a) an organic polyisocyanate,
  (b) an aqueous basic solution and/or an aqueous basic suspension having an inorganic solid content of from 20–80% by weight preferably from 30–70% by weight,
  (c) a flowable inorganic compound and optionally
  (d) catalysts and other additives and allowing the resulting mixture to react, characterized in that mixing is carried out by first combining components (a) and (b), optionally with the addition of all or part of component (d), to form a stable primary dispersion and thereafter adding component (c), optionally the addition of all or part of component (d), to form a final dispersion.

7 Claims, No Drawings

PROCESS FOR THE PRODUCTION OF INORGANIC-ORGANIC SYNTHETIC MATERIALS

BACKGROUND OF THE INVENTION

Inorganic-organic synthetic materials based on polyisocyanates and aqueous alkali metal silicate solutions are already known and are described, for example, in German Offenlegungsschrift No. 1,770,384; U.S. application Ser. No. 527,476, now U.S. Pat. No. 4,097,423; U.S. application Ser. No. 527,478, filed Nov. 26, 1974, now abandoned and U.S. Pat. Nos. 3,965,051, 3,981,831, 3,985,929, 4,042,536 and 4,052,347.

It is possible in this way to produce synthetic materials which, because of their inorganic content, are more fire-resistant than purely organic materials. They may be cellular or non-cellular, hard or soft, brittle or flexible, depending on their composition and the reaction conditions under which they have been produced. These inorganic-organic synthetic materials are suitable for a wide variety of uses due to the great variation in their properties.

Common to all of these materials is that to produce them, the inorganic and organic phases must be mixed together. W/O type dispersions (water-in-oil) or O/W type dispersions (oil-in-water) are thereby obtained. The synthetic materials which are obtained from a W/O type dispersion are particularly interesting. They have great mechanical strength, even when exposed to moisture, because the hardened continuous organic phase envelops the hardened aqueous inorganic discontinuous phase and thereby fixes it. The improved fire resistance of such systems also depends on the perfectly continuous organic phase of these materials due to the water which is enclosed by this phase.

Attempts have been made to produce the synthetic materials described above by mixing the starting components in an intermittently or continuously operating mixing apparatus in one or more stages and then leaving the resulting dispersion to solidify.

However, the products obtained by this method generally lose their mechanical strength progressively with the increasing proportion of inorganic component in them, and in extreme cases they may even disintegrate to a sandy texture and have cavities. However, it is precisely these products with a large inorganic content which are particularly interesting in economic grounds and because of their greater fire resistance.

It is an object of the present invention to obviate the disadvantages described above and to provide a problem-free method of producing inorganic-organic synthetic materials with even large quantities of inorganic components.

These problems are solved by the process according to the invention.

DESCRIPTION OF THE INVENTION

The present invention relates to a process for the production of inorganic-organic synthetic materials characterized by high strength, elasticity, dimensional stability under heat, and flame resistance and consisting of a composite polymer-polysilicic acid gel material in the form of a solid/solid xerosol, comprising (a) an organic polyisocyanate, (b) an aqueous basic solution and/or an aqueous basic suspension having an inorganic solids content of from 20 to 80% by weight, preferably from 30 to 70% by weight.

(c) a flowable inorganic compound, and, optionally (d) catalysts and other additives, and leaving the resulting mixture to react, characterized in that mixing is carried out by first combining components (a) and (b), optionally with the addition of all or part of component (d), to form a stable primary dispersion and thereafter adding component (c), and if desired and/or necessary with all or part of component (d), to form the final dispersion.

According to the invention, the final dispersions preferably have viscosities in the range of 600 to 6000 cP at room temperature before hardening begins and consists of from 50 to 90% by weight of inorganic aqueous phase and 10 to 50% by weight of organic phase.

The process according to the invention may be carried out continuously but is preferably carried out batchwise. In the batchwise method, the stable primary dispersion of polyisocyanate, aqueous basic solution or suspension and optionally other additives such as activators, emulsifiers and blowing agents is first prepared and the inorganic compound, component (c) is added thereafter. In the continuous method, a special arrangement of apparatus is provided so that the primary dispersion is first prepared in a preliminary chamber in the same way as in the batchwise method and mixing of this primary dispersion with the inorganic compound, component (c), is carried out continuously in a mixing area arranged after the preliminary chamber.

According to the invention, mixing of the individual components may be carried out, for example, in the following sequence: First, a dispersion is prepared from components (a) and (b) optionally with the addition of all or part of component (d), by means of a mixing apparatus. To this dispersion is added component (c) in a mixing apparatus arranged after the first, if necessary and/or desired with all or part of component (d).

The following machinery arrangements may be used for carrying out this successive mixing on a commercial scale:

(1) Two mixing heads with agitators;

(2) Two mixing units consisting of two mixing elements arranged one above the other on a driven shaft, components (a) and (b), and optionally (d), being introduced in the upper part of the driven shaft and component (c) and, if indicated (d) in the lower part of the shaft;

(3) Mixing units consisting of two static mixers arranged one after the other; components (a) and (b), and optionally (d), be introduced into the first static mixer and after passing through the first mixing path they are mixed with component (c), and if indicated (d), in the second static mixer;

(4) A first mixing unit consisting of a mixing head with agitator, and a second mixing unit consisting of a static mixer.

(5) A static mixer as the first mixing unit and a mixing head with agitator as the second mixing unit is a mixing head with agitator.

The batchwise method is recommended in cases where component (c) includes inorganic compounds which have a spontaneous gelling effect, e.g. on aqueous alkali metal silicate solutions. In such a case, a stable primary dispersion is preferably first prepared from the polyisocyanate and e.g. the aqueous alkali metal silicate, and component (c) is added thereafter.

The longer mixing times which are often desirable can be realized in the batchwise method by adding the catalyst of component (d) suitable for hardening only after the stable primary dispersion has been prepared.

Inorganic compounds used as component (c) which gel aqueous alkali metal silicates only very slowly if at all may be used both by the continuous method and by the batchwise method.

The polyisocyanates used as starting components, component (a), according to the invention may be aliphatic, cycloaliphatic, araliphatic, aromatic or heterocyclic polyisocyanates such as those described, for example, by W. Siefken in Justus Liebigs Annalen der Chemie, 562, pages 75 to 136. Specific examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and 1,4-diisocyanate and mixtures of these isomers, 1-isocyanato-3,3,5-trimethyl-5-isocyanatomethyl-cyclohexane as described in German Auslegeschrift No. 1,202,785 and U.S. Pat. No. 3,401,190; hexahydrotolylene-2,4-diisocyanate and 2,6-diisocyanate and mixtures of these isomers; hexahydrophenylene-1,3-diisocyanate and/or 1,4-diisocyanate; perhydrodiphenylmethane-2,4'-diisocyanate and/or 4,4'-diisocyanate; phenylene-1,3-diisocyanate and -1,4-diisocyanate; tolylene-2,4-diisocyanate and -2,6-diisocyanate and any mixtures of these isomers; diphenyl methane-2,4'-diisocyanate and/or 4,4'-diisocyanate; naphthylene-1,5-diisocyanate; triphenylmethane 4,4',4''-triisocyanate; polyphenyl-polymethylene polyisocyanates which can be obtained by aniline-formaldehyde condensation followed by phosgenation and which have been described; for example, in British Pat. Nos. 874,430 and 848,671; m- and p-isocyanato-phenyl-sulphonyl isocyanates as described in U.S. Pat. No. 3,454,606; perchlorinated aryl polyisocyanates such as those described, for example, in German Auslegeschrift No. 1,157,601 and U.S. Pat. No. 3,277,138, polyisocyanates having carbodiimide groups as described in German Pat. No. 1,092,007 and U.S. Pat. No. 3,152,162; diisocyanates of the kind described in U.S. Pat. No. 3,492,330; polyisocyanates with allophanate groups as described e.g. in British Pat. No. 994,890; Belgian Pat. No. 761,626 and published Dutch Patent Application No. 7,102,524; polyisocyanates with isocyanurate groups, e.g. as described in U.S. Pat. No. 3,001,973, German Pat. Nos. 1,022,789, 1,222,067 and 1,027,394 and in German Offenlegungsschriften Nos. 1,929,034 and 2,004,048; polyisocyanates with urethane groups as described e.g. in Belgian Pat. No. 752,261 or in U.S. Pat. No. 3,394,164; polyisocyanates with acylated urea groups as described in German Pat. No. 1,230,778; polyisocyanates with biuret groups as described e.g. in German Pat. No. 1,101,394 and U.S. Pat. Nos. 3,124,605 and 3,201,372 and in British Pat. No. 889,050; polyisocyanates prepared by telomerization reactions as described for example, in U.S. Pat. No. 3,654,106; polyisocyanates having ester groups such as those described, for example, in British Pat. Nos. 965,474 and 1,072,956; U.S. Pat. No. 3,567,763, and German Pat. No. 1,231,688; reaction products of the above mentioned isocyanates with acetals as described in German Pat. No. 1,072,385; and polyisocyanates containing polymeric fatty acid groups as described in U.S. Pat. No. 3,455,883.

The distillation residues obtained from the commercial production of isocyanates and still containing isocyanate groups may also be used, optionally as solutions in one or more of the above mentioned polyisocyanates. Mixtures of any of the above mentioned polyisocyanates may also be used.

As a general rule it is particularly preferred to use readily available polyisocyanates such as tolylene-2,4-diisocyanate and -2,6-diisocyanate and any mixtures of these isomers ("TDI"); polyphenyl-polymethylene polyisocyanates of the kind which can be prepared by aniline-formaldehyde condensation followed by phosgenation ("crude MDI") and polyisocyanates containing carbodiimide groups, urethane groups, allophanate groups, isocyanurate groups, urea groups or biuret groups ("modified polyisocyanates").

Polyisocyanates which contain ionic groups, such as those described in U.S. application Ser. No. 527,476, filed Nov. 26, 1974 are particularly preferred according to the invention. Also useful are sulphonated polyisocyanates as described in German Offenlegungsschrift No. 2,359,614 and U.S. Pat. No. 3,959,329 or polyisocyanates containing carboxylate groups as described in U.S. Pat. No. 3,959,348. Also preferred for the purpose of the invention are non-ionic hydrophilic polyisocyanates such as those described in German Offenlegungsschrift No. 2,325,090; polyisocyanates containing polar groups as described in U.S. application Ser. No. 527,478, filed Nov. 26, 1974, and polyisocyanates containing phenolic hydroxyl groups such as those described in U.S. application Ser. No. 527,476.

The above mentioned, particularly preferred polyisocyanates are preferably prepared from polyphenyl-polymethylene polyisocyanates which are obtained from aniline-formaldehyde condensation followed by phosgenation ("crude MDI") or from the distillation residues which are obtained from the above products by distilling off the dinuclear products and which generally have a viscosity of between 50 and 50,000 P/25° C., an isocyanate content of 28 to 33% by weight and a functionality higher than 2.

The starting components used as component (b) according to the invention include aqueous basic solutions or suspensions having an inorganic solids content of from 20 to 80% by weight, preferably from 30 to 70% by weight. They are preferably aqueous alkali metal silicate solutions or alkali-stabilized silica sols but also include liquid basic suspensions or finely divided fillers. The above mentioned aqueous basic solutions or suspensions are in many cases also used in combination.

By aqueous solutions of alkali metal silicates are meant the solutions of sodium silicate and/or potassium silicate in water which are usually referred to as "waterglass". Crude commercial solutions which in addition contain e.g. calcium silicate, magnesium silicate, borates and aluminates may also be used.

The molar ratio of $Me_2O/SiO_2$ (Me=alkali metal, e.g. sodium or potassium) is not critical and may vary within the usual limits; it preferably ranges from 1:1.6 to 1:3.3. Where the water content of the synthetic material initially obtained by the reaction with the polyisocyanate is of minor importance, either because it has no harmful effect or because it can easily be removed by drying, the reaction may quite well be carried out using only weakly alkaline sodium silicate, which can be prepared e.g. as 20 to 35% by weight solutions. However, it is preferred to use 32 to 54% by weight silicate solutions, which can be obtained at the viscosities necessary for problem-free processing, i.e. below 500 poises, if they are sufficiently alkaline. Ammonium silicate solutions may also be used, e.g. solutions or guanidinium silicate, but they are less preferred. The solutions may be true solutions or colloidal solutions.

The choice of concentration depends on the desired end product. Non-cellular materials or materials with closed cells are preferably prepared from concentrated silicate solutions, which, if necessary, are adjusted to the required low viscosity by the addition of alkali metal hydroxide. Solutions at concentrations of 40 to 70% by weight may be prepared in this way. On the other hand, for producing light-weight, open-celled foams it is preferred to use 30 to 35% by weight silicate solutions in order to obtain lower viscosities, sufficiently long reaction times and low densities. Silicate solutions with concentrations of from 30 to 35% are also preferred when using substantial quantities of finely divided inorganic fillers.

Further detailed information on alkali metal silicate solutions suitable for the process according to the invention may be found in "Soluble Silicates, their properties and uses" by James G. Vail, Reinhold Publishing Corporation, New York 1952.

The substances used as component (c) are flowable inorganic compounds. In the extreme cases, water or inorganic compounds which are insoluble or difficultly soluble in water and are rendered flowable and contain at least 50% by weight of particles below 50 microns, preferably 50% by weight below 10 microns may be used. Inert mineral fillers or hydraulic mineral binders are particularly suitable, especially aqueous suspensions of fillers having a solids content of between 20 and 80% by weight. If the dry fillers already fulfill the criteria according to the invention with regard to the particle size, at least 50% by weight being smaller than 50 microns, they may be directly stirred up with water to form a suspension. If the particles are coarser, an aqueous coarse suspension of the fillers may be converted into a suitable fine suspension according to the invention by known wet milling methods.

Particularly preferred aqueous suspensions are those which are resistant to sedimentation and have an easy viscous flow similar to that of paper coating compositions, for example. For preparing such filler suspensions it is therefore advantageous to employ the methods known for preparing such coating compositions.

The preferred stabilized suspensions according to the invention are those which show no significant signs of sedimentation within one day and have an easy viscous flow. According to the present invention, aqueous filler suspensions are regarded as stabilized if the dispersed fillers are dispersed for the most part as separate particles, free from agglomerates, by one or more of the following measures:

1. Use of extremely finely divided fillers smaller than 20 micron, at least 50% by weight thereof smaller than 2 micron. Particularly suitable are fillers in which 80% of the particles are between 0.5 and 2 microns as is the case, for example, with numerous calcium carbonates.

2. Use of surface modified fillers which have been modified to render them hydrophilic and are therefore more easily dispersed.

3. Preparation of the dispersion using shearing forces which destroy agglomerates, e.g. by the methods commonly used for preparing pigment pastes and pigmented lacquer systems, such as grinding in a three-roll mill, a sand mill or the like.

4. Addition of dispersing agents and dispersion stabilizers, e.g. salts of phosphoric acid, pyrophosphoric acid, metaphosphoric acid, polyphosphoric acids, phosphorous acids, oligosilicic acids, polysilicic acids, organic high molecular weight polyacids such as poly(meth)acrylic acids, copolymers of poly(meth)acrylic acids, polymaleic acids, copolymeric polymaleic acids, water-soluble derivatives of cellulose, starch, alginic acids and plant gums. The usual surface active compounds such as emulsifiers, wetting agents and surface active agents may also be used.

5. Addition of thickeners such as cellulose derivatives, polyacrylamide, alginates, plant gums or water-soluble polymers, e.g. polyethylene oxide.

6. Addition of high molecular weight and low molecular weight dihydric or polyhydric alcohols or diamines or polyamines.

Suspensions which have been prepared with the addition of from 0.05 to 20% by weight, based on the quantity of filler, of one or more of the additives mentioned under 4, 5 and 6 are particularly preferred. At the same time, the use of surface modified and therefore hydrophilic fillers, which generally avoids the necessity for the use of additives, is also preferred although less advantageous from an economic point of view.

If stabilization of the filler suspension is carried out by means of organic additives, their quantity should not exceed 5%, based on the quantity of filler, in order not to impair the fire resistance characteristics of the inorganic-organic materials.

The suspensions obtained have excellent resistance to sedimentation and suitable flow properties for processing, especially if they contain additives listed under 4 and/or 5 and/or 6 and if in addition they have been prepared according to the criteria mentioned under 1 and 3.

If the filler suspensions are stabilized by additives, at least 90% by weight of the filler particles are preferably below 20 micron and at least 50% by weight below 10 micron.

The filler suspension may, of course, be prepared immediately before it is added to the mixture, for example by introducing dry filler and water into a pipe leading to the mixing chamber in which the polyisocyanate is mixed with aqueous alkali metal silicate, and then producing this aqueous filler suspension in situ by means of a mixing device, e.g. a screw, arranged inside this pipe.

The use of hydraulic binders, in particular cement, generally requires suspension in water or an aqueous alkali metal silicate carried out immediately before the processing with the isocyanate component in order that the setting process and any gelling process caused by the cement may take place in the completely prepared synthetic material.

The filler suspensions used preferably have a viscosity of above 100 cP in order to ensure suitable rheological properties for processing, but they should flow easily and not have a crumbly consistency. The viscosity preferably does not exceed 10,000 cP. Thorough and very intimate mixing with the polyisocyanate in conventional processing apparatus should be ensured. At the same time, the filler content of the aqueous suspension should be as high as possible in order that as little water as possible is introduced into the synthetic material. The concentration of filler is between 20 and 80%, depending upon the particle size and the structure of the filler particles, and is preferably from 30 to 70%. Lower concentrations must generally be used if the filler particles are not spherical, e.g. in the case of asbestos, talcum, various types of clay or special iron oxides. Component c) may in some cases be the same as component b).

According to the invention, readily volatile organic substances may be used as blowing agents. Suitable organic blowing agents include e.g. acetone, ethyl acetate, halogenated alkanes such as methylene chloride, chloroform, ethylidene chloride, vinylidene chloride, monofluorotrichloromethane, chlorodifluoromethane or dichlorodifluoromethane; also butane, hexane, heptane and diethyl ether. The effect of a blowing agent can also be obtained by the addition of compounds which decompose at temperatures above room temperature to release gases such as nitrogen, e.g. azo compounds such as azoisobutyric acid nitrile.

The water contained in the aqueous basic solution or suspension may also function as flowing agent. Fine metal powders, e.g. powdered calcium, magnesium, aluminium or zinc, may also function as blowing agents by evolving hydrogen if the waterglass is sufficiently alkaline, and at the same time they have a hardening and strengthening action.

Catalysts are also frequently used according to the invention. The catalysts added may be known per se, for example tertiary amines such as triethylamine, tributylamine, N-methylmorpholine, N-ethylmorpholine, N-cocomorpholine, N,N,N',N'-tetramethyl-ethylenediamine, 1,4-diazabicyclo-(2,2,2)-octane, N-methyl-N'-dimethylaminoethyl-piperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole, 2-methylimidazole and especially also hexahydrotriazine derivatives.

Tertiary amines containing isocyanate-reactive hydrogen atoms may also be used and include, for example, triethanolamine, triisopropylamine, N-methyl-diethanolamine, N-ethyl-diethanolamine, N,N-dimethylethanolamine and their reaction products with alkylene oxides such as propylene oxide and/or ethylene oxide.

Silaamines having carbon-silicon bonds as described for example in German Pat. No. 1,229,290 may also be used as catalysts, e.g., 2,2,4-trimethyl-2-silamorpholine or 1,3-diethylaminomethyl-tetramethyl-disiloxane.

Basic nitrogen compounds such as tetraalkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts.

Organic metal compounds may also be used as catalysts according to the invention. Particularly preferred are organic tin compounds. The organic tin compounds used are preferably tin (II) salts of carboxylic acids such as tin(II)acetate, tin(II)octoate, tin(II)ethyl hexoate and tin(II) laurate and dialkyl tin salts of carboxylic acids, e.g. dibutyl tin diacetate, dibutyl tin dilaurate, dibutyl tin maleate or dioctyl tin diacetate.

Further examples of catalysts which may be used according to the invention and details concerning the activity of the catalysts are known and are described, e.g., in Kunststoff-Handbuch, Volume VII, published by Vieweg and Hochtlen, Carl-Hanser-Verlag, Munich 1966, pages 96 to 102.

The catalysts are generally used in a quantity of between about 0.001 and 10% by weight, based on the quantity of isocyanate.

Surface active additives (emulsifiers and foam stabilizers) may also be used according to the invention. Suitable emulsifiers include e.g. the sodium salts of ricinoleic sulphonates, sodium salts of sulphonated paraffins or of fatty acids or salts of fatty acids with amines such as oleic acid diethylamine or stearic acid diethanolamine. Alkali metal or ammonium salts of sulphonic acids such as dodecylbenzenesulphonic acid or dinaphthylmethane disulphonic acid or of fatty acids such as ricinoleic acid or of polymeric fatty acids may also be used as surface active additives.

The foam stabilizers used are mainly water-soluble polyether siloxanes. These compounds generally have a polydimethyl siloxane group attached to a copolymer of ethylene oxide and propylene oxide. Foam stabilizers of this kind have been described for example, in U.S. Pat. No. 2,764,565.

Other additives which may also be used according to the invention include reaction retarders, e.g. substances which are acid in reaction such as hydrochloric acid or organic acid halides; cell regulators known per se such as paraffins or fatty alcohols or dimethyl polysiloxanes; pigments; dyes; flame retarding agents known per se such as tris-chloroethylphosphate, or ammonium phosphate and polyphosphate, inorganic salts of phosphoric acid, and chlorinated paraffins; stabilizers against ageing and weathering; plasticizers; fungistatic and bacteriostatic substances; and fillers such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the invention and details concerning the use and mode of action of these additives may be found in Kunststoff-Handbuch, Volume VII, Published by Vieweg and Hochtlen, Carl-Hanser-Verlag, Munich 1966, pages 103 to 113. The components are preferably mixed at room temperature. From the proportions of 10 to 50% by weight of inorganic aqueous phase and 90 to 50% by weight of organic phase, it is clear that the proportions of the components used in the reaction according to the invention are not critical.

The choice of mixing process employed depends to a large extent on the nature of the fillers. The following are examples of fillers which are preferably used as aqueous suspensions and treated by the batchwise process according to the invention because they spontaneously gel all or part of the aqueous alkali metal silicates: Calcium hydroxide, magnesium hydroxide, calcium carbonate, magnesium carbonate, chalk, lime, dolomite, calcium sulphate, gypsum and anhydride. Examples of fillers which may be mixed either by the batchwise or by the continuous method are those which gel aqueous alkali metal silicates only slowly if at all and which may therefore be used in the process according to the invention as aqueous suspensions or suspensions in aqueous alkali metal silicate. The following are specific examples: Iron oxides, aluminium oxides, quartz powder, clay, asbestos, powdered glass, silicate minerals, aqueous cements and red band cement, quick setting cement and high alumina cement. From the proportions indicated above of 50 to 90% by weight of inorganic-aqueous phase and 10 to 50% by weight of organic phase, it is clear that the proportions are not critical for the production of such artificial materials by the process according to the invention.

In assessing the practical and commercial advantages provided by the invention, it is assumed that the primary dispersion prepared by the process according to the invention is extremely stable and that other additives do not jeopardize this stable state during the period of reaction and hardening.

The dispersions obtained according to the known state of the art, on the other hand, generally pass through unstable states of dispersion accompanied by a change in the W/O phase structure, as the proportion of inorganic component increases. After hardening, these unstable states may result in defects in the structure of the inorganic-organic synthetic material. The reason for these structural defects is that inorganic substances introduced by the conventional methods of mixing may initiate a process of separation into the components, thereby preventing the production of commercially useful inorganic-organic materials. It is regarded as probable that such states gel the inorganic phase and/or that sufficient mixing between the organic and inorganic phase fails to take place, due to premature cross-linking reactions with the polyisocyanate.

The synthetic materials according to the invention, including the foams, provide new possibilities in the field of civil engineering as well as in the manufacture of prefabricated parts and elements.

Examples of possible applications of the products include the manufacture of prefabricated wall elements, roll front cupboards, window-sills, overground and underground railway sleepers, curbstones and staircases, the filling of joints by foaming and the laminating of ceramic tiles with foam.

Aerated concrete is also suitable for setting gravel or pieces of marble or similar materials, for example to produce decorative panels such as those used as facade elements.

The invention will now be described in more detail with the aid of the following Examples.

EXAMPLES (Percentages are given as parts by weight unless otherwise indicated)

Starting materials:

(a) Polyisocyanate component $A_3$: Diisocyanatodiphenylmethane is distilled off the crude phosgenation product of an aniline-formaldehyde condensate until the distillation residue has a viscosity of 400 cP at 25° C. (dinuclear content: 45.1% by weight, trinuclear content: 22.3% by weight, proportion of higher polynuclear polyisocyanates: 32.6% by weight), isocyanate content: 30–31% by weight.

$A_1$: $A_3$ sulphonated with gaseous sulphur trioxide (sulphur content: 0.96%, isocyanate content: 30.5%, viscosity at 25° C.: 24,000 cP, prepared according to U.S. Pat. No. 3,959,329.)

$A_2$: $A_3$ similarly sulphonated with chlorosulphonic acid (sulphur content: 0.9%, isocyanate content: 30.2%, viscosity at 20° C.: 2000 cP.)

(b) Silicate component $B_1$: Sodium waterglass, 44% solid content, molecular weight ratio $Na_2O:SiO_2 = 1:2$.

$B_2$: Sodium waterglass, 48.6% solid content, molecular weight ratio $Na_2O:SiO_2 = 1:2$.

(c) Polyether $C_2$: Polyethylene oxide-monohydric alcohol started on n-butanol, hydroxyl number: 49.2

$C_1$: Polypropylene tetraalcohol started on ethylene diamine, hydroxyl number 630.

(d) Suspensions $D_1$: 1000 g of a filter sludge of the type Iron black 320 (Bayer AG) having a solid content of 62% and a predominant particle size of $0.2\mu$ (the pigment is spherical) are stirred at room temperature into 1000 g of a 54% sodium silicate solution having an $SiO_2/Na_2O$ ratio of 2.0. The sedimentation resistant suspension obtained has the following composition:
31% by weight iron oxide
27% by weight sodium silicate
42% by weight water.

$D_2$: 2.5 kg of white calcium hydroxide (particle size: 80% smaller than $30\mu$; white hydrated lime manufactured by Arminia-Hydroka) were suspended in 2.5 kg of water, 100 g of a 30% aqueous solution of a high molecular weight dipotassium salt of maleic acid/styrene copolymer containing carboxylate and sulphonate groups, and 209 g of 30% aqueous iron (III) chloride solution. Solids content: 47%.

EXAMPLE 1

| | |
|---|---|
| 450 g of polyisocyanate $A_1$ | ⎫ |
| 85 g of trichlorofluoromethane | ⎬ Component I |
| 0.2 g. of stabilizer L 5340 (polyether polysiloxane of Union Carbide Corp. | ⎭ |
| 600 g of silicate component $B_1$ | ⎫ |
| 1 g of emulsifier (sodium salt of a sulphochlorinated $C_{10}$–$C_{14}$ paraffin mixture) (50% aqueous solution) | ⎬ Component II |
| 300 g water | ⎫ |
| 7 g triethylamine | ⎬ Component III |

Components I and II were first mixed for 10 seconds, using a high speed stirrer, and component III was added with stirring within 10 seconds. After a total mixing time of 30 seconds, the reaction mixture was poured into paper packets. It began to foam up after $t_L = 40$ sec. and had solidified after $t_A = 58$ sec. A hard inorganic-organic heavy foam having the following values was obtained: Gross density [kg/m$^3$]: 152. Compression resistance [MPa]: 0.77.

COMPARISON EXAMPLE 1a

Components II and III were first mixed as in Example 1. The resulting mixture was slowly stirred into component I within 20 seconds. A hard inorganic-organic foam having the following values was obtained:

$t_R$ (stirring time): 30 sec., $t_L$ (cream time): 43 sec., $t_A$ (gel time): 60 sec. Gross density [kg/m$^3$]: 223.

COMPARISON EXAMPLE 1b

Components II and III were first mixed as described in Example 1 and the mixture was rapidly stirred into component I within 5 seconds. After a total mixing time of $t_R = 30$ sec., the mixture was poured out into a paper packet and began to foam up after $t_L = 44$ sec., and had solidified after $t_A = 68$ sec. with formation of a cavity. A sandy, inhomogeneous, cavity filled material which had no measurable compression resistance was obtained.

EXAMPLE 2

| | |
|---|---|
| 400 g polyisocyanate $A_1$ | } Component I |
| 80 g trichlorofluoromethane | |
| 200 g silicate component $B_1$ | } Component II |
| 1 g emulsifier according to Example 1 | |
| 1000 g silicate component $B_1$ | } Component III |
| 8 g triethylamine | |

Foaming was carried out as described in Example 1. A hard inorganic-organic heavy foam having the following values was obtained:

$t_R$: 30 sec., $t_L$: 37 sec., $t_A$: 54 sec. Gross density [kg/m$^3$]: 241. Compression resistance [MPa]: 0.3.

COMPARISON EXAMPLE 2a

When components I, II and III from Example 2 were all mixed together at the same time, a highly viscous, unpourable reaction mixture which had no tendency to foam was obtained within a stirring time of 30 seconds.

COMPARISON EXXAMPLE 2b

When components I, II and III from Example 2 were all mixed together at the same time and the quantity of the activator, triethylamine, in component III was reduced from 8 g to 6 g, a pourable reaction mixture which foamed up after $t_L=36$ sec. and solidified after $t_A=72$ sec. was obtained after $t_R=20$ sec. A sandy, non-homogeneous product which was full of cavities and had little strength was obtained.

COMPARISON EXAMPLE 2c

A mixture was prepared from components II and III from the above comparison Example 2b and was then slowly stirred in component I within 20 seconds. A hard inorganic-organic heavy foam having the following values was obtained:

$t_R$: 30 sec., $t_L$: 34 sec., $t_A$: 56 sec. Gross density [kg/m$^3$]: 268. Compression resistance [MPa]: 0.41.

EXAMPLE 3

| | |
|---|---|
| 400 g polyisocyanate $A_1$ | } Component I |
| 80 g trichlorofluoromethane | |
| 200 g silicate component $B_1$ | } Component II |
| 1 g emulsifier according to Example 1 | |
| 600 g silicate component $B_1$ | } Component III |
| 6 g triethylamine | |

Foaming was carried out as described in Example 1. A hard heavy foam having the following values was obtained:

$t_R$: 30 sec., $t_L$: 35 sec., $t_A$: 50 sec. Gross density [kg/m$^3$]: 213. Compression resistance [MPa]: 0.48.

EXAMPLE 4

| | |
|---|---|
| 400 g polyisocyanate $A_1$ | } Component I |
| 90 g trichlorofluoromethane | |
| 200 g silicate component $B_1$ | } Component II |
| 1 g emulsifier according to Example 1 | |
| 600 g silicate component $B_1$ | } Component III |
| 8 g triethylamine | |
| 40 g water | |
| 1200 g alumina cement "Lafarge Fondu" | |

Foaming was carried out as in Example 1. A hard heavy foam having the following values was obtained:

$t_R$: 30 sec., $t_L$: 36 sec., $t_A$: 52 sec. Gross density [kg/m$^3$]: 406. Compression resistance [MPa]: 1.37.

EXAMPLE 5

Polyisocyanate $A_1$ was replaced by polyisocyanate $A_2$. Foaming was otherwise carried out as described in Example 1, using the components from Example 4.

$t_R$: 30 sec., $t_L$: 37 sec., $t_A$: 67 sec., Gross density [kg/m$^3$]: 242. Compression resistance [MPa]: 0.42.

EXAMPLE 6

Example 5 was repeated, using 75 g of trichlorofluoromethane.

$t_R$: 30 sec., $t_L$: 34 sec., $t_A$: 52 sec. Gross density [kg/m$^3$]: 383. Compression resistance [MPa]: 1.09.

EXAMPLE 7

| | |
|---|---|
| 400 g polyisocyanate $A_2$ | } Component I |
| 90 g trichlorofluoromethane | |
| 200 g silicate component $B_1$ | } Component II |
| 1 g emulsifier according to Example 1 | |
| 600 g silicate component $B_1$ | } Component III |
| 8 g triethylamine | |
| 40 g water | |
| 1200 g alumina cement "Lafarge Fondu" | |

Components II and III were first mixed and the mixture was then slowly stirred in component I within 20 seconds. A hard heavy foam having the following values was obtained:

$t_R$: 30 sec., $t_L$: 32 sec., $t_A$: 49 sec. Gross density [kg/m$^3$]: 395. Compression resistance [MPa]: 0.80.

COMPARISON EXAMPLE 7a

Components II and III were first mixed as in Example 5 and the mixture was then stirred in component I rapidly within 5 seconds. After a stirring time of 20 seconds, a highly viscous, unpourable reaction mixture which did not foam up was obtained. The solidified product had a sandy-crumbly consistency.

EXAMPLE 8

| | |
|---|---|
| 400 g polyisocyanate $A_1$ | } Component I |
| 65 g trichlorofluoromethane | |
| 200 g silicate component $B_1$ | } Component II |
| 1 g emulsifier according to Example 1 | |
| 700 g suspension $D_1$ | } Component III |
| 7 g triethylamine | |

Foaming was carried out as in Example 1.

$t_R$: 30 sec., $t_L$: 34 sec., $t_A$: 46 sec. Gross density [kg/m$^3$]: 273. Compression resistance [MPa]: 1.02.

COMPARISON EXAMPLE 8a

Components II and III were first mixed and was then slowly stirred into component I within 20 seconds
$t_R$: 30 sec., $t_L$: 33 sec., $t_A$: 40 sec. Gross density [kg/m$^3$]: 280. Compression resistance [MPa]: 1.17.

COMPARISON EXAMPLE 8b

When the components from Example 8 were all mixed together at the same time, a highly viscous, unpourable reaction mixture which had no tendency to foam up was obtained after a stirring time of 30 seconds.

EXAMPLE 9

| | |
|---|---|
| 400 g polyisocyanate $A_1$ | Component I |
| 80 g trichlorofluoromethane | |
| 200 g silicate component $B_1$ | Component II |
| 1 g emulsifier according to Example 1 | |
| 300 g silicate component $B_1$ | Component III |
| 700 g suspension $D_1$ | |
| 7 g triethylamine | |

Foaming was carried out as in Example 1.
$t_R$: 30 sec., $t_L$: 38 sec., $t_A$: 52 sec. Gross density [kg/m$^3$]: 370. Compression resistance [MPa]: 1.21.

COMPARISON EXAMPLE 9a

When all the components from Example 9 were mixed together at the same time, a pourable reaction mixture was obtained after a stirring time of $t_R=20$ sec.:
$t_L=32$ sec. and $t_A=70$ sec. A cavity-filled, sandy, inhomogeneous product with little strength was obtained.

EXAMPLE 10

| | |
|---|---|
| 400 g polyisocyanate $A_1$ | Component I |
| 80 g trichlorofluoromethane | |
| 400 g silicate component $B_1$ | Component II |
| 1 g emulsifier according to Example 1 | |
| 400 g suspension $D_2$ | Component III |
| 3.5 g triethylamine | |

Foaming was carried out as in Example 1. A hard, heavy foam having the following values was obtained.
$t_R$: 30 sec., $t_L$: 37 sec., $t_A$: 51 sec. Unit weight [kg/m$^3$]: 245.

COMPARISON EXAMPLE 10a

When attempts were made to mix the components from Example 10 all at the same time, the reaction mixture abruptly gelled.

EXAMPLE 11

| | |
|---|---|
| 100 g polyisocyanate $A_3$ | Component I |
| 300 g silicate component $B_2$ | |
| 50 g trichlorofluoromethane | Component II |
| 25 g tris-($\beta$-chloroethyl)-phosphate | |
| 10 g polyether $C_1$ | |
| 5 g polyether $C_2$ | |
| 1 g stabilizer L 5340 (polysiloxane of Union Carbide Corp.) | |
| 1 g dimethylbenzylamine | |
| 200 g silicate component $B_2$ | Component III |

Component I as first mixed on its own for 5 seconds, using a high speed stirrer, and it was then stirred up with component II for 10 seconds to form the primary dispersion. Component III was stirred in after a total stirring time of 15 seconds. After $t_R=30$ sec., the reaction mixture was poured into a paper packet where it began to foam up after $t_L=36$ sec. and was solidified after $t_A=130$ sec. A tough elastic inorganic-organic lightweight foam having a gross density of 78 kg/m$^3$ was obtained.

COMPARISON EXAMPLE 11a

When all the components from Example 11 were mixed together at the same time, a reaction mixture was obtained after a stirring time of 30 seconds, which mixture foamed up after $t_L=32$ sec. and solidified after $t_A=75$ sec. A very non-uniform foam with a large cavity was obtained.

EXAMPLE 12

| | |
|---|---|
| 100 g polyisocyanate $A_3$ | Component I |
| 200 g silicate component $B_2$ | |
| 40 g trichlorofluoromethane | Component II |
| 25 g tris-($\beta$-chlorethyl)-phosphate | |
| 11 g polyether $C_1$ | |
| 1 g stabilizer accordig to Example 11 | |
| 1 g dimethylbenzylamine | |
| 100 g silicate component $B_2$ | Component III |

Foaming was carried out as in Example 11. A tough-elastic lightweight foam having the following values was obtained:
$t_R$: 30 sec., $t_L$: 36 sec., $t_A$: 90 sec. Gross density [kg/m$^3$]: 70.

COMPARISON EXAMPLE 12a

When the components from Example 12 were all mixed together at the same time, the reaction mixture obtained after a stirring time of $t_R=30$ sec. foamed up after 35 seconds and collapsed during foaming.

What is claimed is:
1. A process for the production of inorganic-organic synthetic foam materials having high strength elasticity, dimensional stability under heat, and flame resistance, consisting of a polymer-polysilicic acid gel composite material in the form of a solid/solid xerosol, said process comprising mixing
   (a) an organic polyisocyanate
   (b) an aqueous alkali metal silicate solution and/or an aqueous silica sol having an inorganic solid content of from 20–80% by weight,
   (c) a flowable solid inorganic compound and optionally
   (d) catalysts and conventional polyurethane foam additives and allowing the resulting mixture to react, characterized in that mixing is carried out by first combining components (a) and (b), optionally with the addition of all or part or none of component (d), to form a stable primary dispersion and thereafter adding component (c), optionally with the addition of all or part or none of component (d), to form a final dispersion.

2. The process of claim 1, characterized in that the alkali metal silicate used is sodium silicate having an $Na_2O:SiO_2$ molar ratio in the range of from 1:1.6 to 1:3.3.

3. The process of claim 1, characterized in that the organic polyisocyanates used are phosgenation products of aniline/formaldehyde condensation.

4. The process of claim 1, characterized in that the polyisocyanate used is a polyisocyanate which has ionic groups.

5. The process of claim 4, characterized in that the ionic group-containing polyisocyanate is a polyisocyanate containing sulphonic acid and/or sulphonate groups.

6. The process of claim 1, characterized in that the polyisocyanate used is a prepolymer which has isocyanate end groups and contains non-ionic hydrophilic groups.

7. Inorganic-organic synthetic materials obtainable according to claim 1, wherein the inorganic portion of component (b) is from 50–90% by weight and component (a) is from 10 to 50% by weight.

* * * * *